US012075875B2

(12) United States Patent
Robinson et al.

(10) Patent No.: US 12,075,875 B2
(45) Date of Patent: Sep. 3, 2024

(54) CAP LOGO APPLICATOR

(71) Applicant: Stahls' Inc., St. Clair Shores, MI (US)

(72) Inventors: Benjamin B. Robinson, Smithfield, PA (US); Anton Galkin, Sterling Heights, MI (US); Weiyu Zhang, Pittsburgh, PA (US)

(73) Assignee: Stahls' Inc., St. Clair Shores, MI (US)

( * ) Notice: Subject to any disclaimer, the term of this patent is extended or adjusted under 35 U.S.C. 154(b) by 0 days.

(21) Appl. No.: 18/086,054

(22) Filed: Dec. 21, 2022

(65) Prior Publication Data

US 2023/0128158 A1 Apr. 27, 2023

Related U.S. Application Data

(63) Continuation of application No. 17/243,023, filed on Apr. 28, 2021.

(60) Provisional application No. 63/018,753, filed on May 1, 2020.

(51) Int. Cl.
*A42C 1/08* (2006.01)
*B41F 16/00* (2006.01)
*B41F 17/00* (2006.01)

(52) U.S. Cl.
CPC ............ *A42C 1/08* (2013.01); *B41F 16/0046* (2013.01); *B41F 16/008* (2013.01); *B41F 17/003* (2013.01)

(58) Field of Classification Search
CPC ........... A42C 1/08; B30B 1/04; B30B 15/064; B41F 16/0046; B41F 16/008; B41F 17/003
USPC .......................................................... 156/475
See application file for complete search history.

(56) References Cited

U.S. PATENT DOCUMENTS

2019/0126665 A1* 5/2019 Figueroa ................ A42B 1/004

FOREIGN PATENT DOCUMENTS

EP 2606761 A1 * 6/2013 ........... A43B 3/0078

OTHER PUBLICATIONS

Wikipedia article entitled "Heat Press", Mar. 15, 2017, XP055842743. retrieved from the internet: https://web.archive.org/web/20170315030450/htpps://en.wikipedia.org/wiki/Heat_press (retrived on Sep. 20, 2021).

Extended European Search Report dated Sep. 28, 2021 for copending European Patent App. No. EP21171484.5.

* cited by examiner

*Primary Examiner* — Philip C Tucker
*Assistant Examiner* — Jimmy R Smith, Jr.
(74) *Attorney, Agent, or Firm* — Fishman Stewart PLLC

(57) ABSTRACT

A lower mandrel for a cap logo applicator includes a structure having a curved surface and a first end and a second end, an extension extending from the first end to the second end, and a first pad positioned on an upper surface of the structure. The first pad extends radially beyond both the first end and the second end and below a lower surface of the structure.

18 Claims, 9 Drawing Sheets

CAP LOGO APPLICATOR

CROSS-REFERENCE TO RELATED APPLICATIONS

This application is a Continuation of and claims priority to U.S. patent application Ser. No. 17/243,023, filed on Apr. 28, 2021, which claims priority to U.S. Provisional Patent Application Ser. No. 63/018,753, filed on May 1, 2020, the contents of both of which are hereby expressly incorporated by reference in their entirety.

TECHNICAL FIELD

The exemplary illustrations described herein are generally directed to presses, such as heat transfer presses for applying logos to caps and other headware.

BACKGROUND

Caps, such as baseball caps, have become common headware for use not only by sports players, but within the general population as well. Typically, a cap includes a top piece, which may include a crown that contacts a wearer's forehead. The crown may be structured or unstructured, with a structured crown providing backing so that the cap holds its shape during use. An unstructured crown may not provide stiff backing so that the crown may sit lower on the forehead.

The cap may include a bill, brim, or visor that extends from the front of the top piece. The top piece typically includes one, two, or more front panels from which the bill extends. The top piece may include eyelets that allow for the head to breath or exchange air for ventilating the head and cooling the head during use. The top piece may include a button of sorts that may be positioned on the top center of the top piece where the panels join, which may serve for ornamental purposes or to join portions of the top piece together. The cap may include a sweat band on the inside that may be a cloth or other absorbent material positioned on or near the crown, to collect sweat and prevent or reduce sweat from running down the face of the wearer.

The back of the cap may include an opening that is adjustable so that various size heads can be accommodated with one cap. The strap may include one or more protrusions on one side and holes or apertures in the other, so that the two sides can be joined together at a preferred size, providing the adjustability for different head sizes.

It is common to wear a cap with a logo on the front panel(s) of the cap. Such logos may include sports logos, business logos, and the like. The logos may be word marks, letters, brands, or iconic (such as a famous person or quotation). The logos may be transfers that are applied to hats having an embroidered or other stitched appearance. The logos may be applied using adhesives that are heat-activated. In one example, the logo is printed directly to the face of the panel(s).

Thus, application of a logo to a cap may be in various types of cap designs, and a variety of features and sizes of both the cap and the logo may be accommodated.

A traditional cap printing machine uses a curved (cylindrical) heater with matching mandrel and pad. That is, a mandrel may be cylindrical in shape over a portion, so that the panel(s) rest on the cylindrical mandrel for printing. A typical printing machine may use a curved (cylindrical) heater with matching mandrel and pad. Typically, the pad is a medium-durometer silicone foam sponge that may accommodate high temperatures, such as 430° F. The cylindrical design may be optimized or sized to fit one particular (and more common) size cap, while other size caps thereby become deformed during heat printing, which can produce heat marks because the cap may not optimally deform (or conform) during the heating process.

Accordingly, there remains a need for an improved logo applicator for caps.

BRIEF DESCRIPTION

A cap logo applicator includes a lower mandrel having a front and a back, the lower mandrel having a curved, non-cylindrical upper surface, and a relief space in the back such that when a cap is positioned on the lower mandrel, a front of the cap is in contact with the non-cylindrical upper surface and a top of the cap extends over the relief space, and an upper mandrel configured to apply pressure to the lower mandrel. At least one of the lower mandrel and the upper mandrel includes a heater.

A method of fabricating a cap logo applicator includes providing a lower mandrel having a front and a back, the lower mandrel having a curved, non-cylindrical upper surface, and a relief space in the back such that when a cap is positioned on the lower mandrel, a front of the cap is in contact with the non-cylindrical upper surface and a top of the cap extends over the relief space, configuring an upper mandrel to apply pressure to the lower mandrel, and positioning a heater in at least one of the lower mandrel and the upper mandrel.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description.

DETAILED DESCRIPTION

Figure 1:
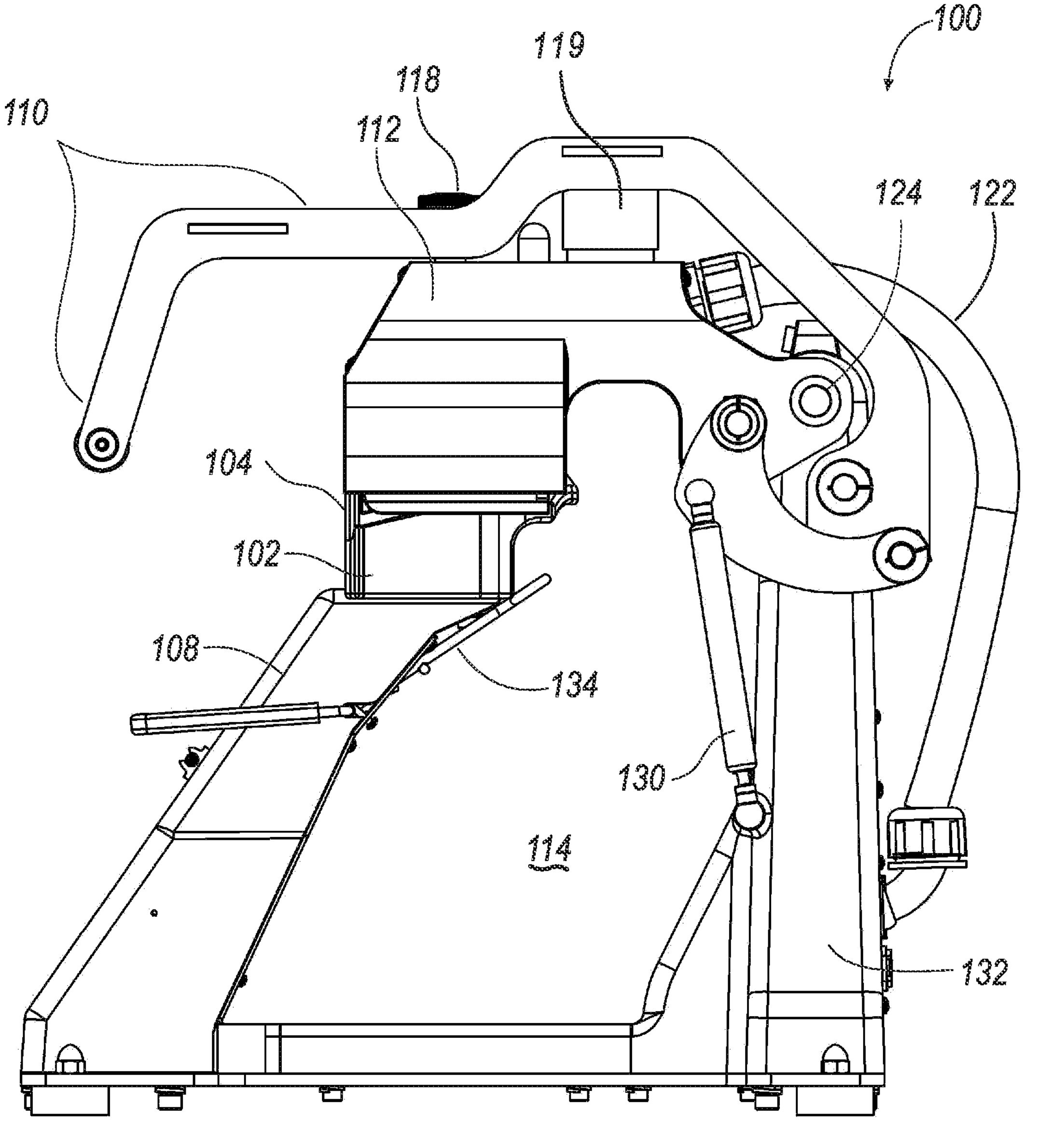
FIG. 1 illustrates a side view of an exemplary cap logo applicator in a closed position, according to the disclosure.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Figure 2:
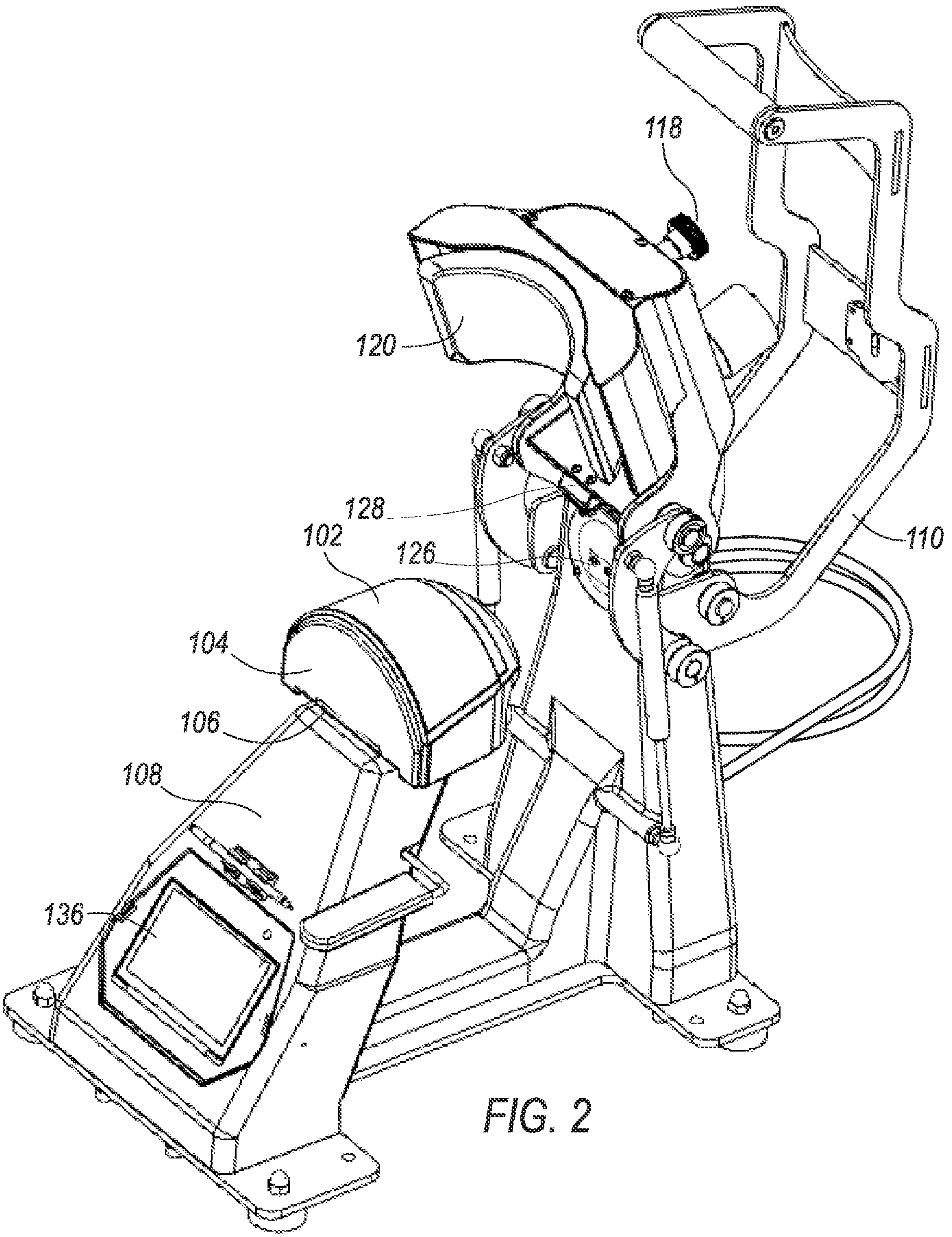
FIG. 2 shows a perspective view of the cap logo applicator in an open position.
Figure 3:
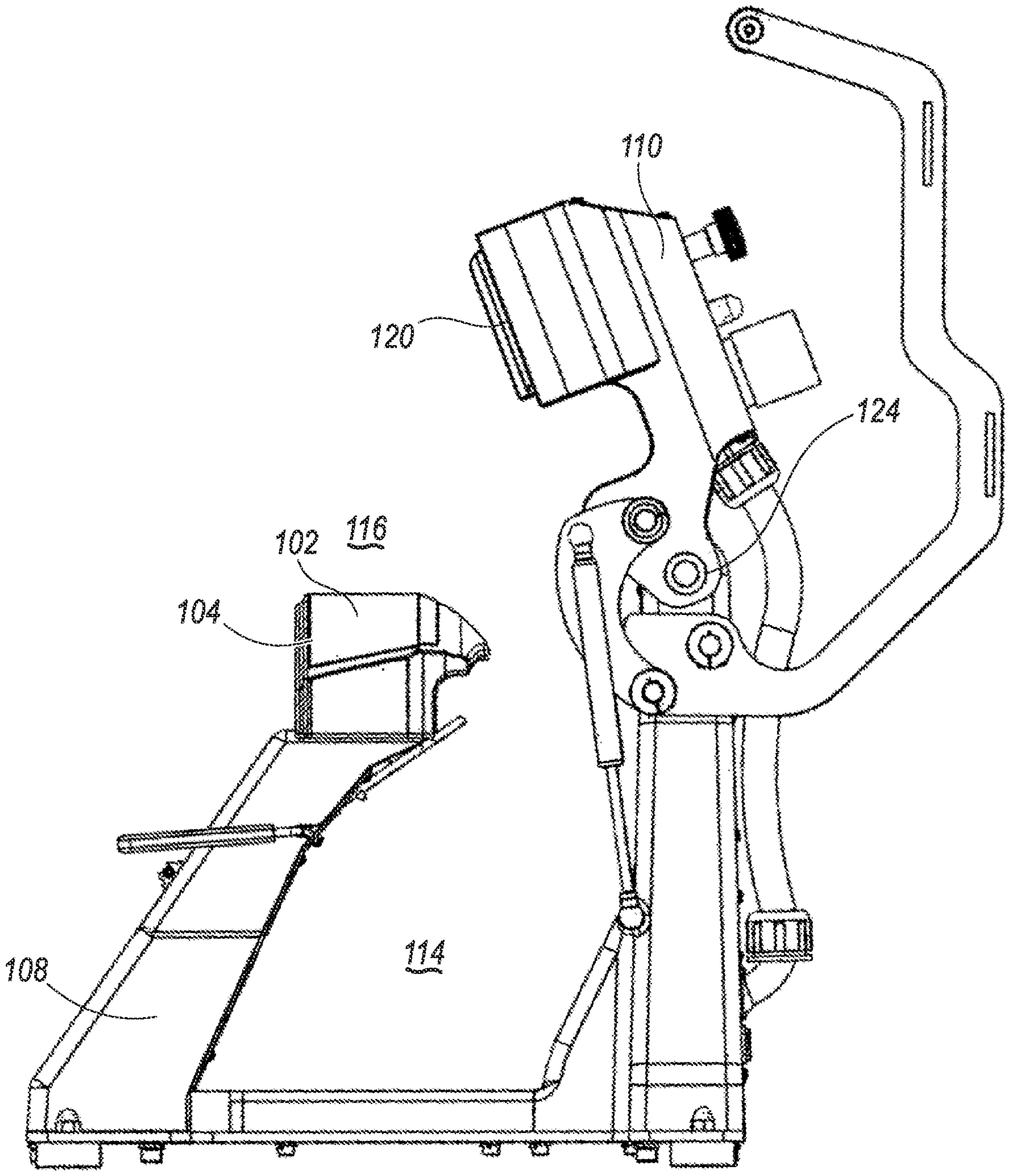
FIG. 3 shows a side view of the cap logo applicator in an open position.

FIG. 1 illustrates a side view of an exemplary cap logo applicator in a closed position, according to the disclosure. Applicator 100 shows in its closed state when in position to apply a logo to a cap, FIGS. 2 and 3 show applicator 100 in its open position, respectively in perspective and side views.

A "snap cap" 102, or more generally a "silicone rubber pad" is positioned on a lower heater/mandrel 104 and is supported by a lower support 108. A handle/pressure linkage 110 is manually operated to move an upper mandrel, opposing lower mandrel 104, and having a heater 120 into position against lower heater/mandrel 104 for use. A rubber damping pad 106 is positioned between lower heater/mandrel 104 and lower support 108 to provide damping when pressure is applied to lower heater/mandrel 104 and to uniformly apply pressure. A heater arm 112 provides structural support to upper heater 120. The amount of pressure applied to lower heater/mandrel 104 may be adjusted via a pressure adjustment knob 118.

A column or electrical enclosure 132 provides overall support to heater arm 112, which pivot about each other at pivot point 124. A flexible conduit 122 provides support and insulation for power to move from a base of a column 132 to heater arm 112. An electromagnet 119 is positioned between print handle/pressure linkage 110 and heater arm 112 for selective operation when lowering and raising print handle/pressure linkage 110, which pulls up heater arm 112 and then disengages therefrom to complete the motion upward when heater arm 112 completes its motion upward. Activation of electromagnet 119 maintains the two in unison or coupled when activated and when de-activated the two may be separate from one another, as shown in FIGS. 2 and 3. A cap hold-down mechanism 134 is activated that includes a capture mechanism that engages with a back of the cap, such as in the strap region, to pull the cap taught against lower heater/mandrel 104. A spring 130, which may be gas or a mechanical spring, applies pressure against motion of handle/pressure linkage 110 such that, when print handle/pressure linkage 110 and electromagnet 119 are released, handle/pressure linkage 110 moves upward to disengage from heater arm 112. An electronic controller 136 may have a touchscreen interface, or may be button-operated, as examples, which allow for programming various functions (such as time of pressure, temperature settings, and the like) and for setting other control parameters.

Controller 136 may generally include computational and control elements (e.g., a microprocessor or a microcontroller). Controller 136 may generally provide time monitoring, temperature monitoring, pressure monitoring, and control, as examples. A readout may further include various readout displays, e.g., to allow display of a force, temperature, or time associated with operation of the press. Moreover, the readout may allow for manipulation of the controller by a user, e.g., by way of the touchscreen or other interface.

A proximity switch 126 and proximity magnet 128 operate in conjunction with one another to provide feedback information as to the position of heater arm 112 when in operation. Referring to FIG. 3, openings 114 and 116 are selected to provide sufficient space above and below lower heater/mandrel 104 for ease of inserting caps over lower heater/mandrel 104, and for space below lower heater/mandrel 104 to accommodate various sizes of caps. The proximity sensor may run for a pre-set time in controller 136 once the proximity is detected and then audible or other notice to indicate a predetermined time has passed.

Figure 4A:
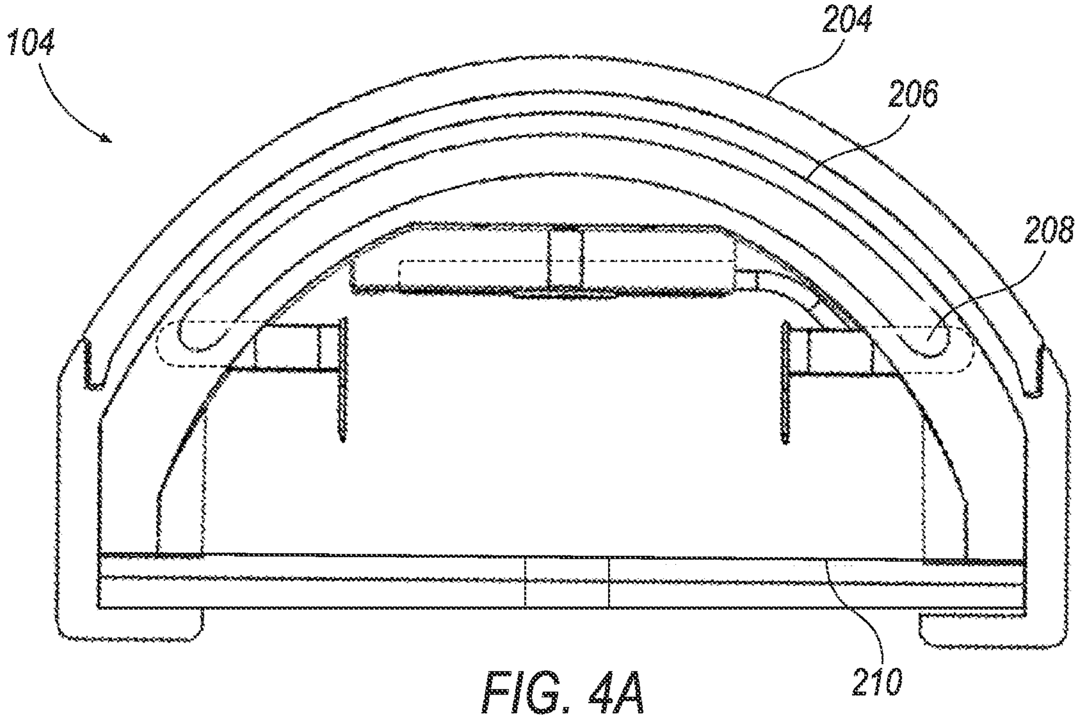
FIG. 4A is a front cross-sectional view of a lower mandrel.
Figure 4B:
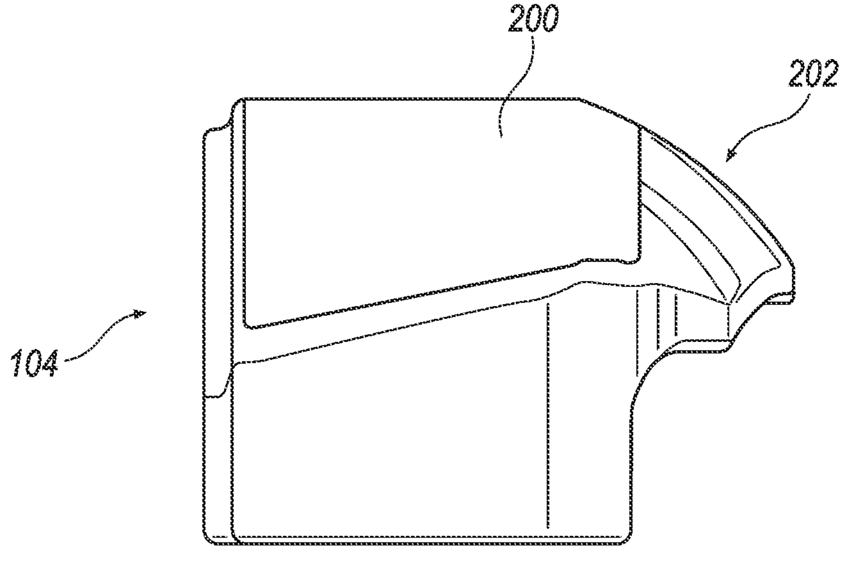
FIG. 4B is a side view of the lower mandrel.
Figure 5:
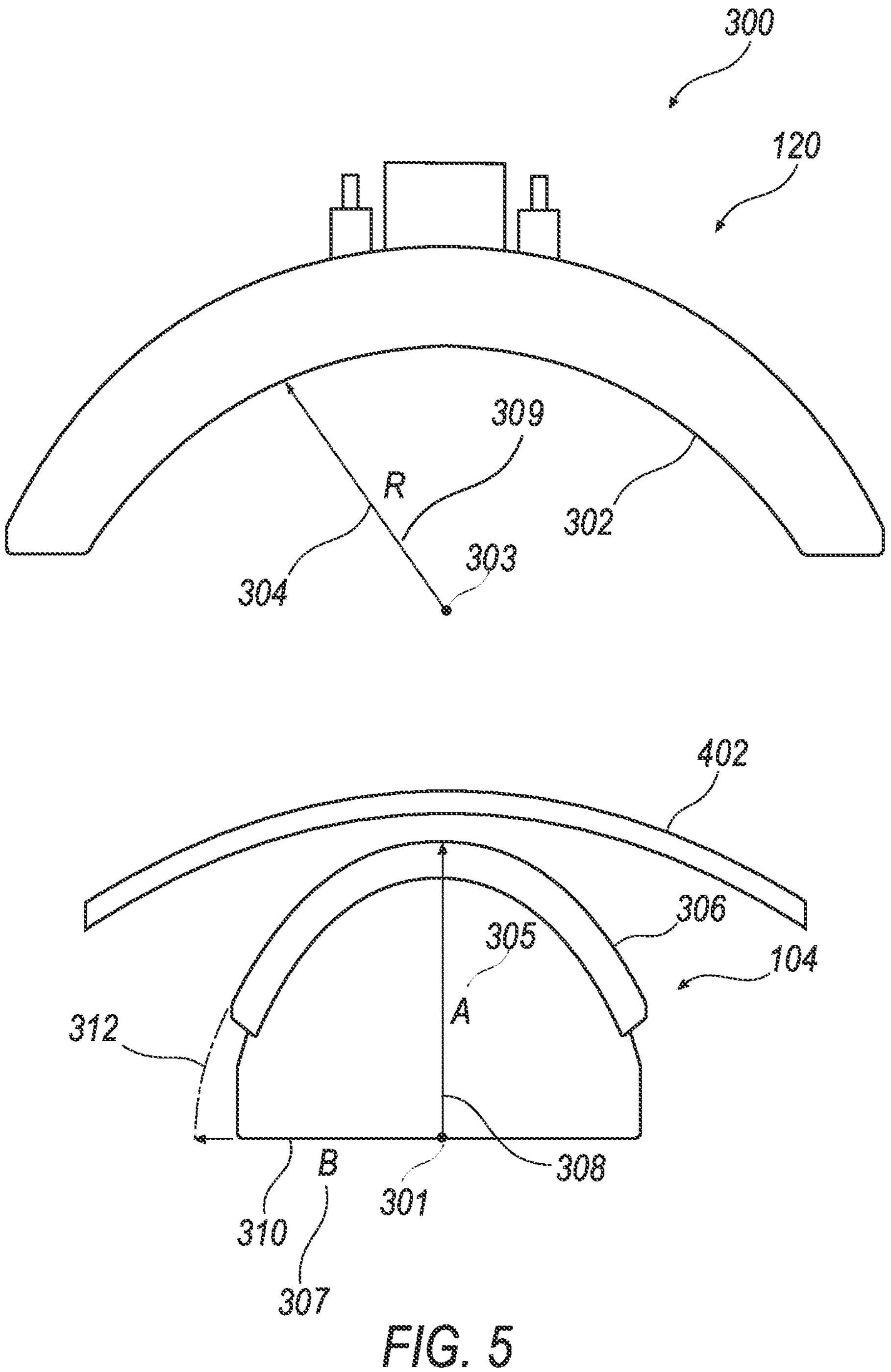
FIG. 5 shows and end view graphical illustration of the mandrel and heater in an open position.

FIG. 4A is a front cross-sectional view of lower heater/mandrel 104 and FIG. 4B is a side view of lower heater/mandrel 104. FIG. 5 shows and end view graphical illustration of the mandrel and heater in an open position.

Referring to FIG. 4A, lower heater/mandrel 104 includes a pad that is a solid silicone with a duo-durometer arrangement having two layers 204, 206 of different durometer materials. The duo-durometer arrangement provides particular benefit because the lower durometer "soft" material on the top layer 204 provides an amount of "give" or relief that allows localized deformation to occur, as seen in FIG. 4B, such as due to a non-uniform thickness of a logo or other transfer to be applied to the cap. The lower pad 206 having the higher durometer or "medium" material relative to the soft top pad provides additional support and stronger "snap" or secure attachment to the mandrel and is less prone to localized distortion that can occur due to irregularities in the surface of the transfer.

In general, the term "durometer" is used as a measure of hardness for materials such as polymers, elastomers, and rubbers. Softer materials has a lower durometer value than harder materials. In this case, a "soft" durometer material, such as in top layer 204 may be in the range of 8-10 shore A durometer, and that of the medium durometer for lower pad 206 may be in the range of 20-25 shore A durometer.

Upper pad 204, being softer than the lower pad 206, provides additional but more gross distortion ability that allows for equalization of forces when the mandrel pressure is applied. Thus, the duo-durometer configuration, according to the disclosure, thereby provides both an overall amount of give that allows for gross normalization of forces when the mandrel pressure is applied, and the softer top pad allows for more localized distortion of the transfer so that non-uniform features of the transfer itself to not cause high pressure to occur in localized areas of the transfer.

Thus, referring to FIGS. 1-5, cap logo applicator 100 includes lower mandrel 104 having a front and a back, lower mandrel 104 having a curved, non-cylindrical upper surface 200, and a relief space 202 in the back such that when a cap 402 is positioned on lower mandrel 104, a front of cap 402 is in contact with non-cylindrical upper surface 200 and a top of cap 402 extends over relief space 202. Upper mandrel 120 is configured to apply pressure to lower mandrel 104. At least one of lower mandrel 104 and upper mandrel 120 includes a heater (which, in either embodiment, is incorporated into lower mandrel 104 and/or upper mandrel 120)

FIG. 5 shows a cap 402 relative to lower mandrel 104 and upper mandrel 120. Curved, non-cylindrical upper surface 200 of lower mandrel 104 is shaped as defined by a portion of an ellipse. Lower mandrel 104 is shaped based on a first center point 301, and a major axis 308 and a minor axis 310, major axis 308 extending in a generally vertical direction of applicator 100, with minor axis 310 orthogonal to major axis 308.

A first distance 305, illustrated with the letter "A", is defined from first center point 301 of the ellipse to an upper surface 306 of lower mandrel 104 and along major axis 308, and a second distance 307, illustrated with a letter "B", is defined from first center point 301 of the ellipse to a hypothetical upper surface 312 of lower mandrel 104 and along minor axis 310. In this description, upper surface 312 is referred to as "hypothetical", as lower mandrel 104 may not extend all the way to intersect with minor axis 310, but may instead stop short. As such, lower mandrel 104 is defined in such as fashion that it follows along a surface of the described ellipse, but may not extend along all the way to minor axis 310. Furthermore, although described as an ellipse having major and minor axis 308, 310, it is understood that the "ellipse" may, but need not, follow exact definitions of a mathematical ellipse, and the major and minor axes 308, 310, and corresponding distances 305, 307, may be selected to be curved and oblong in nature, but not necessarily defined only by strict mathematical terms of an ellipse. According to one example, first distance 305 is greater than second distance 307.

Referring still to FIG. 5, upper mandrel 120 is defined by a portion of one of a circle and an ellipse having a center point 303, and a distance 304, illustrated with a letter "R", is defined from second center point 303 of the circle or ellipse to a lower surface 302 of upper mandrel 120. According to one example, distance 304 of upper mandrel 120 is greater than distance 305 of lower mandrel 104. As such, a curvature of upper mandrel 120 may follow an arc of a circle, that of an ellipse, or a curvature that does not exactly match that of a mathematical ellipse.

Thus, according to the disclosure and referring to the illustrations, the disclosed mandrels include a cylindrical, non-cylindrical, or elliptical shapes, where B<R<A.

According to one example, cap logo applicator 100 may include a heater in upper mandrel 120, lower mandrel 104, or both upper mandrel 120 and lower mandrel 104.

According to the disclosure and as seen in FIGS. 4A and 4B, lower mandrel 104 includes a duo-durometer imaging area that includes a first pad 206 having a first durometer, and a second pad 204 positioned on first pad 206 and having a second durometer that is different from the first durometer. In one example, the second durometer is lower than the first durometer. Further, referring particularly to FIG. 4B, non-cylindrical upper surface 200 extends toward the back of lower mandrel 104 and forms relief space 202 as a downward curving surface. Relief space 202 allows localized deformation to occur to occur in a hat, such as due to a non-uniform thickness of a logo or other transfer to be applied to the cap. Lower pad 206 having the higher durometer or "medium" material relative to the soft top pad provides additional support and stronger snap to the mandrel and is less prone to localized distortion that can occur due to irregularities in the surface of the transfer.

Referring to FIGS. 1-3, applicator 100 includes lower support 108 that supports the lower mandrel 104, heater arm 112 that supports upper mandrel 120, and column support 132 that supports heater arm 112. A pivot located at a pivot point 124 between heater arm 112 and column support 132. Print handle linkage 110 extends from a front of applicator 100 and is attached to column support 132 to apply the pressure to lower mandrel 104. Electromagnet 119 is positioned between heater arm 112 and print handle 110, such that, activation of electromagnet 119 maintains print handle 110 and heater arm 112 in unison when activated.

Applicator 100 includes a spring 130 positioned between column support 132 and heater arm 112. Spring 130 applies pressure against motion of print handle linkage 110 such that, when print handle linkage 110 and electromagnet 119 are released, it causes print handle linkage 110 to move upward and disengage from heater arm 112.

According to the disclosure, both large and small hat sizes are accommodated without deformation, as well as thick and thin transfer materials may be applied due to the unique nature of the duo-durometer design. It is also contemplated that more than two pads having different durometer may also be considered according to the disclosure, and in one example a relatively high durometer material may be on the bottom, a soft durometer material on top, and a mid-durometer material sandwiched therebetween.

The mandrel has the described "relief" area behind the imaging area to further reduce this tendency of deforming and causing heat marks. The cap is fixed in position stretching it over the lower heater/mandrel 104 using cap hold-down mechanism 134. The fabric of the cap is stretched evenly over the curved "relief" area instead of corners and edges found in traditional mandrel design, preventing the fabric from permanently adopting uneven deformation as a result of the heat and pressure of operation. The mandrel is heated and the silicone pad has thermal conductive additives. Thick transfers (e.g., 3D emblems) are, in one example and according to the disclosure, heated from underneath to activate the adhesive without damaging the transfer. The silicone pad is formed into a specific shape which envelops the fixed mandrel without adhesive, making it easily and readily replaceable.

Thus, according to the disclosure, not only is the mandrel non-cylindrical in shape, but the imaging area itself includes a duo-durometer pad having a medium-durometer material as a 'base' material and a relatively soft durometer pad positioned on the medium-durometer material. The two pads are of sufficient thermal conductivity to allow adequate temperature to form and in a reasonable time to accomplish target temperatures for the cap positioned thereon. Also disclosed is a relief area that provides support for the cap when positioned on the mandrel while also providing a slight curvature downward and away from the imaging area which provides sufficient support, but the relief also allows the cap to be pulled away from the imaging area and in a region where no imaging is to occur, which eliminates heat marks that can otherwise form.

It is contemplated that the mandrel size is not limited to a size that fits a cap, such as a baseball cap. The mandrel may be a different size to fit very small caps such as for children or infants, or for oversized caps such as in a promotional or other design where 'gigantic' hats are used as in a sporting event to be used by fans in a stadium, as an example.

Figure 6:
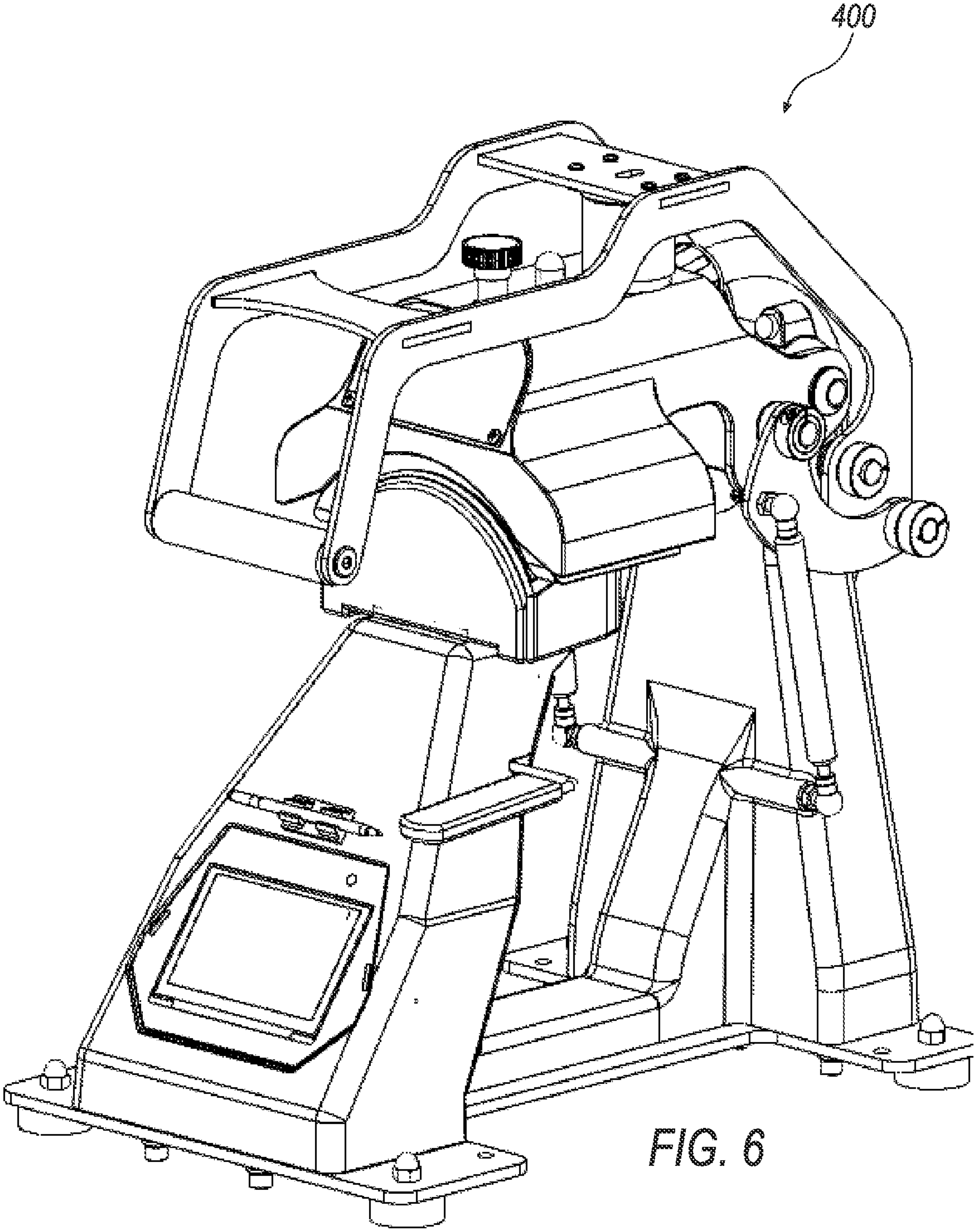
FIG. 6 shows the cap logo applicator according to the disclosure in a closed position and without a cap on the lower mandrel.
Figure 7:
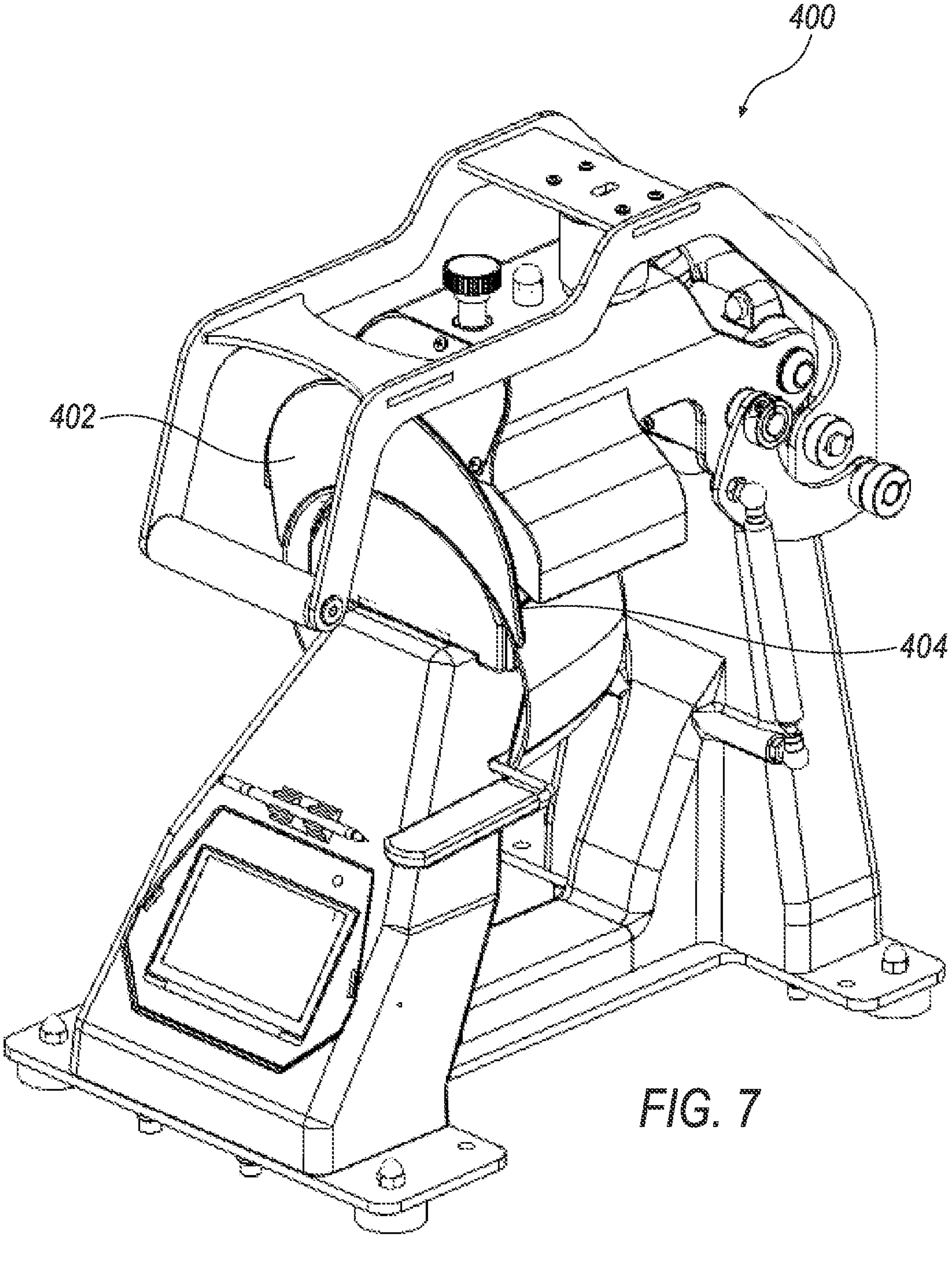
FIG. 7 shows cap logo applicator according to the disclosure in a closed position and ready having a cap on the lower mandrel, the bill (and front of the cap) facing upward.
Figure 8:
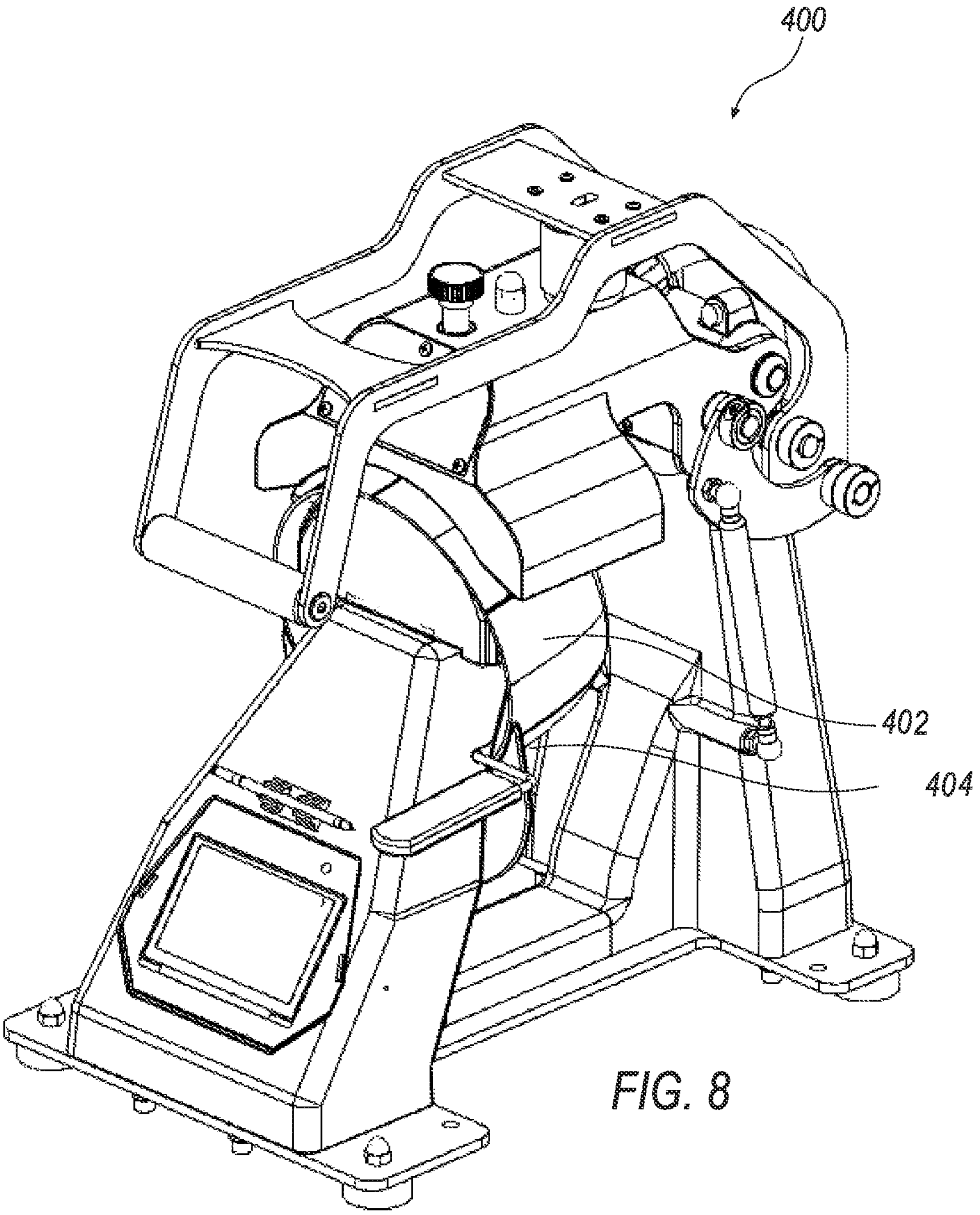
FIG. 8 shows cap logo applicator according to the disclosure in a closed position and having a cap on the lower mandrel, the bill (and front of the cap) facing downward.
Figure 9:
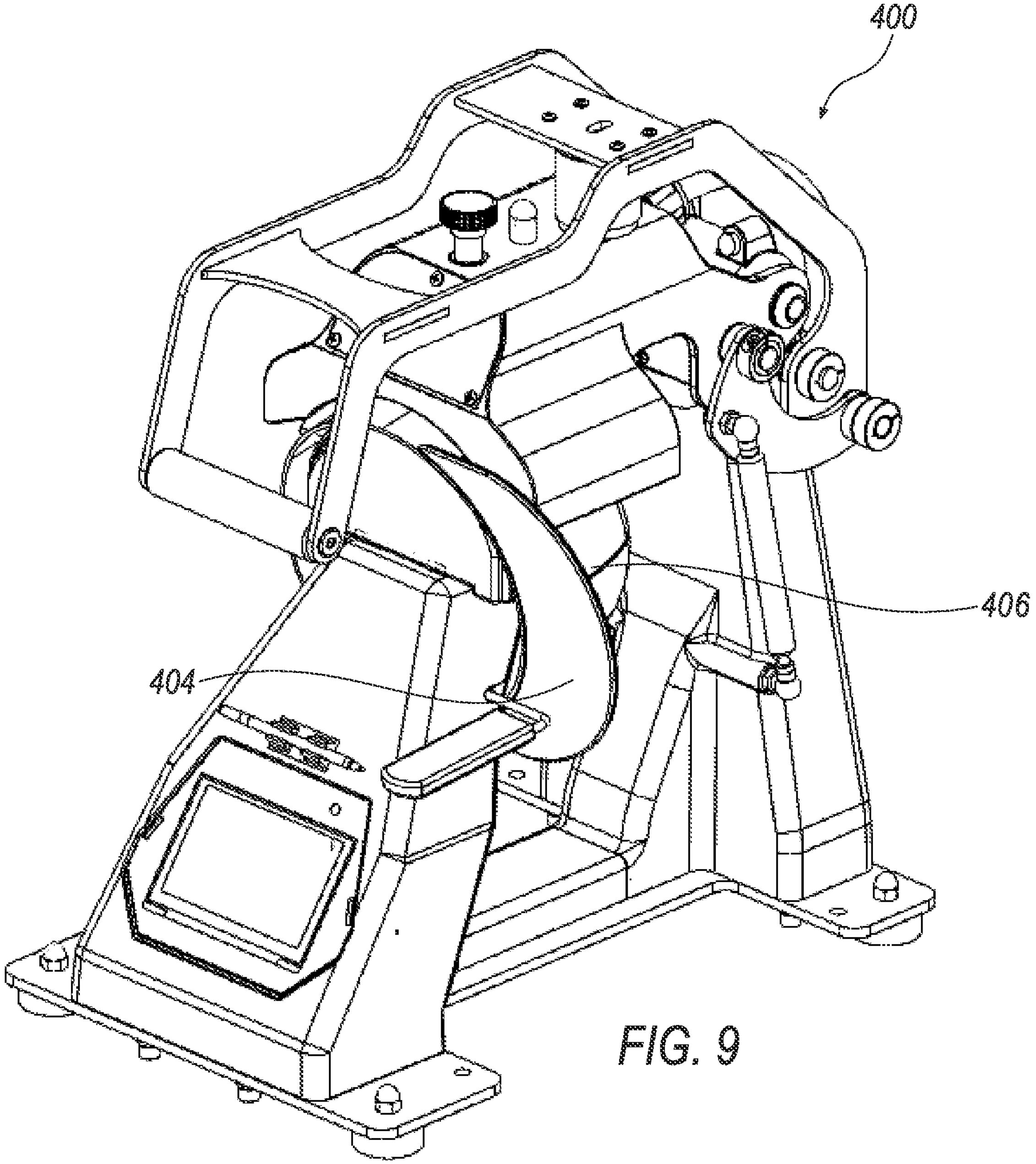
FIG. 9 shows cap logo applicator according to the disclosure in a closed position and having a cap on the lower mandrel, the bill (and front of the cap) facing sideways.

FIGS. 6-9 show the disclosed cap logo applicator according to the disclosure and in various modes of operation. FIG. 6 shows cap logo applicator 400 in a closed position and but without a cap on the lower mandrel. FIG. 7 shows cap logo applicator 400 in a closed position and having a cap 402 on the lower mandrel, the bill (and front of the cap) facing upward. FIG. 8 shows cap logo applicator 400 in a closed position and having cap 402 on the lower mandrel, the bill (and front of the cap) facing downward. FIG. 9 shows cap logo applicator 400 according in a closed position and having cap 402 on the lower mandrel, the bill (and front of the cap) facing sideways. The cap can thus be positioned to apply a logo to the front, side, back, etc. of the cap. A logo 406 is positioned on cap 402 and in a general vicinity of 404, though may be positioned in various locations to be attached to cap, in the arrangements of FIGS. 7, 8, and 9, showing how the upper mandrel interacts with the lower mandrel, and in the different arrangements where the top of the cap extends into the relief area toward the top of the cap, allowing for heating the logo for attachment to the cap, without causing undo heating of other parts of the cap that are away from where the logo is located.

Thus, according to the disclosure, a cap logo applicator includes a lower mandrel having a front and a back, the lower mandrel having a curved, non-cylindrical upper surface, and a relief space in the back such that when a cap is positioned on the lower mandrel, a front of the cap is in contact with the non-cylindrical upper surface and a top of the cap extends over the relief space, and an upper mandrel configured to apply pressure to the lower mandrel. At least one of the lower mandrel and the upper mandrel includes a heater.

Also according to the disclosure, a method of fabricating a cap logo applicator includes providing a lower mandrel having a front and a back, the lower mandrel having a curved, non-cylindrical upper surface, and a relief space in the back such that when a cap is positioned on the lower mandrel, a front of the cap is in contact with the non-cylindrical upper surface and a top of the cap extends over the relief space, configuring an upper mandrel to apply pressure to the lower mandrel, and positioning a heater in at least one of the lower mandrel and the upper mandrel.

The exemplary illustrations are not limited to the previously described examples. Rather, a plurality of variants and modifications are possible, which also make use of the ideas of the exemplary illustrations and therefore fall within the protective scope. Accordingly, it is to be understood that the above description is intended to be illustrative and not restrictive.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A lower mandrel for a cap logo applicator, comprising:
a structure having a curved surface and a first end and a second end;
an extension extending from the first end to the second end; and
a first pad positioned on an upper surface of the structure;
wherein the first pad extends radially beyond both the first end and the second end and the first pad wraps around the first end and the second end at a bottom surface of the structure.

2. The lower mandrel of claim 1, further comprising a second pad positioned on the first pad.

3. The lower mandrel of claim 2, wherein the first pad has a first durometer and the second pad has a second durometer that is different from the first durometer.

4. The lower mandrel of claim 3, wherein the first durometer is greater than the second durometer.

5. The lower mandrel of claim 2, wherein the first pad includes a cutout portion in which the second pad is positioned.

6. The lower mandrel of claim 1, wherein the first pad extends from the upper surface of the structure and wraps around to an underside of the extension.

7. The lower mandrel of claim 1, wherein the structure is a curved, non-cylindrical surface shaped as defined by a portion of an ellipse having a first center point, and a major axis and a minor axis, the major axis extending in a generally vertical direction, and the minor axis that is orthogonal to the major axis.

8. The lower mandrel of claim 7, wherein a first distance is defined from the first center point of the ellipse to the curved, non-cylindrical surface and along the major axis, and a second distance is defined from the first center point of the ellipse to a hypothetical surface of the lower mandrel and along the minor axis, and wherein the first distance is greater than the second distance.

9. The lower mandrel of claim 8, wherein the curved, non-cylindrical surface extends toward a back of the cap logo applicator and forms a relief space as a downward curving surface.

10. A method of fabricating a lower mandrel for a cap logo applicator, comprising:
providing a structure having a curved, non-cylindrical surface, and a relief space in the back such that when a cap is positioned thereon, a front of the cap is in contact with the non-cylindrical surface and a top of the cap extends over the relief space, the structure having a first end and a second end;
positioning an extension to extend from the first end of the structure to the second end of the structure; and
positioning a first pad on an upper surface of the structure;
wherein positioning the first pad further comprises positioning the first pad to extend radially beyond both the first end and the second end and so that the first pad wraps around the first end and the second end at a bottom surface of the structure.

11. The method of claim 10, further comprising positioning a second pad on the first pad.

12. The method of claim 11, wherein positioning the first pad further comprises positioning the first pad with a first durometer, and positioning the second pad comprises positioning the second pad having a second durometer that is different from the first durometer.

13. The method of claim 12, wherein the first durometer is greater than the second durometer.

14. The method of claim 10, wherein the positioning the first pad includes the first pad having a cutout portion in which a second pad is positioned.

15. The method of claim 10, further comprising wrapping the first pad from the upper surface of the structure around an underside of the extension.

16. The method of claim 10, wherein the curved, non-cylindrical surface shaped is defined by a portion of an ellipse having a first center point, and a major axis and a minor axis, the major axis extending in a generally vertical direction, and the minor axis that is orthogonal to the major axis.

17. The method of claim 16, wherein a first distance is defined from the first center point of the ellipse to the curved, non-cylindrical surface and along the major axis, and a second distance is defined from the first center point of the ellipse to a hypothetical surface of the first lower mandrel and along the minor axis, and wherein the first distance is greater than the second distance.

18. The method of claim 10, wherein the curved, non-cylindrical surface extends toward a back of the cap logo applicator and forms the relief space as a downward curving surface.

* * * * *